Aug. 19, 1930.   W. J. McCAIG ET AL   1,773,109
TOASTING MACHINE
Filed Jan. 30, 1929.   3 Sheets-Sheet 2

INVENTORS
William J. McCaig
Lester E. Padelford
BY
ATTORNEY

Aug. 19, 1930.   W. J. McCAIG ET AL   1,773,109
TOASTING MACHINE
Filed Jan. 30, 1929   3 Sheets-Sheet 3

INVENTORS
William J. McCaig and
Lester E. Padelford

BY  J. Wm. Ellis
ATTORNEY

Patented Aug. 19, 1930

1,773,109

UNITED STATES PATENT OFFICE

WILLIAM J. McCAIG AND LESTER E. PADELFORD, OF BUFFALO, NEW YORK, ASSIGNORS TO REPUBLIC METALWARE COMPANY, OF BUFFALO, NEW YORK, A CORPORATION OF NEW YORK

TOASTING MACHINE

Application filed January 30, 1929. Serial No. 336,212.

Our invention relates in general to toasting machines, and in particular to a machine for toasting bread.

The principal objects of our invention have been to provide a device in which bread may be easily and quickly placed in position by an inexperienced operator, and one in which the bread will continuously pass through the machine at such a rate that when it is discharged therefrom it will be completely toasted on both sides.

Another object has been to provide a device in which the heat shall be automatically controlled so that the bread will always be given the correct temperature to properly toast the same during its course of travel through the machine, thus guarding against under-toasting or burning.

Another object has been to provide a shutter for closing the top of the toasting chamber when the machine is temporarily stopped, thus conserving the heat within the chamber.

Another object has been to provide switch controlled means, whereby the motor for driving the toast conveyer can not be shut off until the conveyer has reached a position where the shutter can pass between any two bread baskets.

Moreover, our device is provided with hand-operated means, which permits the toast conveyer to be operated independently of the motor driving means.

Furthermore, our device is so designed that the loading side of the conveyer is inclined and is exposed for a considerable portion of its length, whereby a number of pieces of bread may be quickly and easily placed into the machine at one time.

The above objects and advantages have been accomplished by the device shown in the accompanying drawings, of which:

Figure 1:
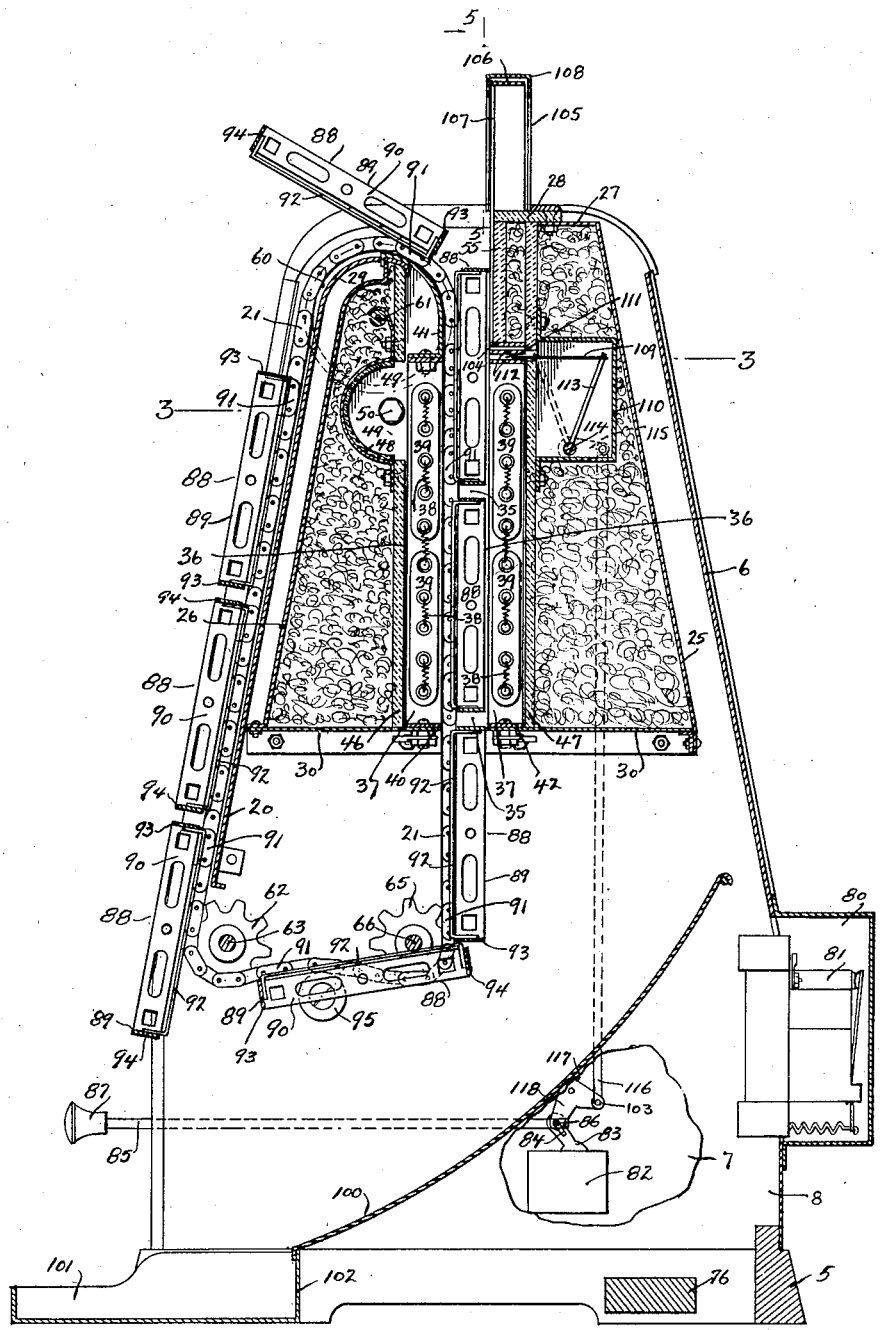
Fig. 1 is a side, vertical, sectional, elevation of our complete device.
Figure 2:
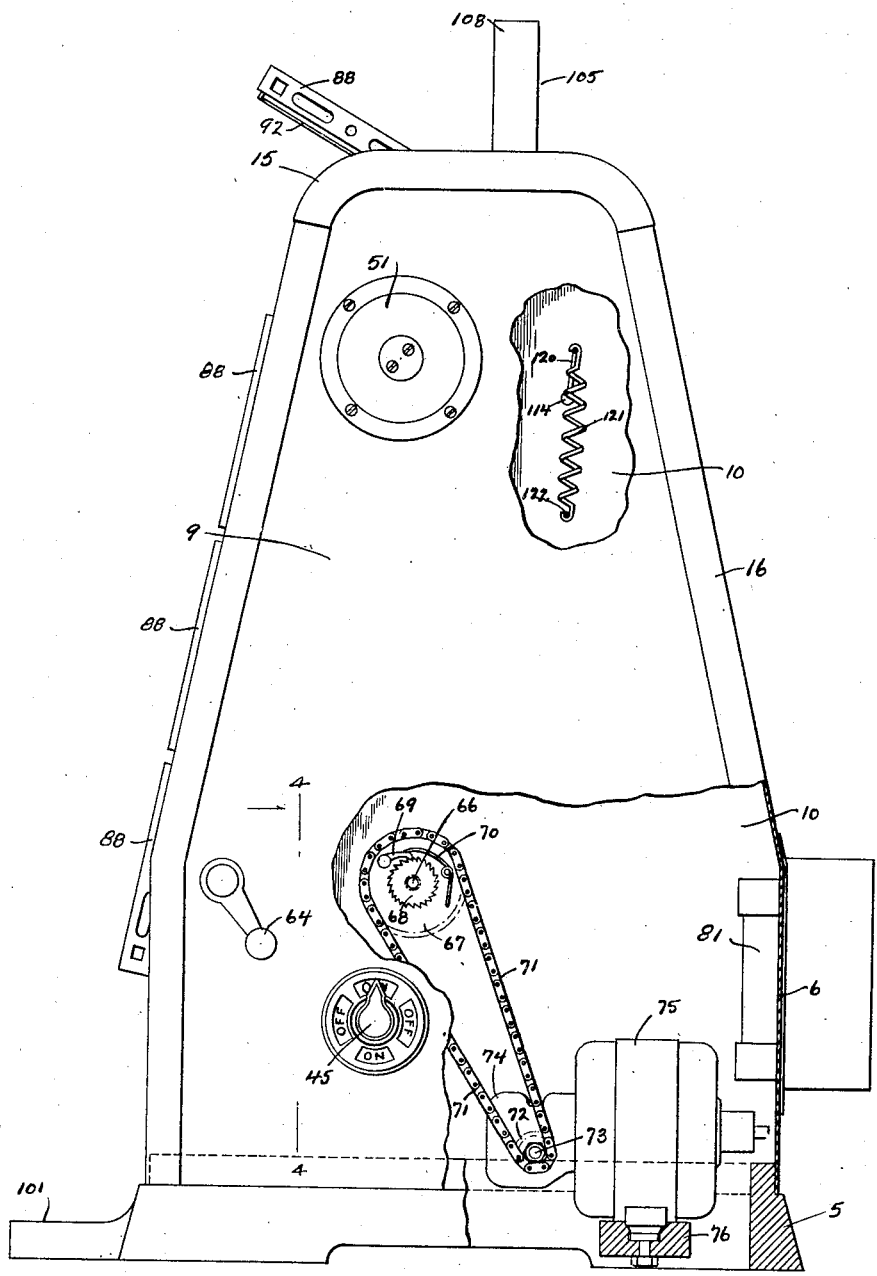
Fig. 2 is a side elevation thereof, partly in section.
Figure 3:
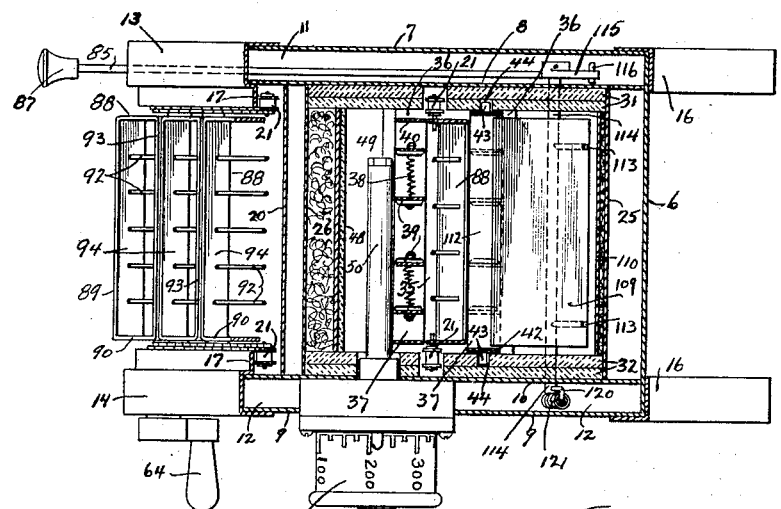
Fig. 3 is a sectional plan view taken on line 3—3 of Fig. 1.

Our device comprises a base 5 which supports all parts of the device. Carried by the base is the casing of the device which has a rear wall 6, having its upper portion inclined inwardly toward the center of the machine. Connected to the rear wall at one side thereof is an outer side wall 7 and an inner side wall 8. Connected to the other side of the rear wall 6 is an outer side wall 9 and an inner side wall 10. The inner and outer side walls 7 and 8, and 9 and 10 are interspaced from each other, thus providing spaces 11 and 12 between each pair of walls, respectively. The inner and outer side walls 7 and 8, and 9 and 10 extend to the front of the machine, and the spaces between them are closed by flanges 13 and 14, respectively. These flanges extend from the base 5 upwardly along the front of the machine where they join with similar flanges 15 extending across the top of the machine. Flanges 16 also extend down each side of the machine at the rear, thereby reinforcing the joint between the rear wall 6 and the side outer walls 7 and 9. The flanges 13 and 14 at the front of the machine are inclined inwardly at their upper portions in a manner similar to the rear wall. Each of the flanges 13 and 14 is provided with an inwardly extending shield 17, to be hereinafter described. The upper portion of the casing at the front is closed by means of a front plate 20 which is inclined preferably to the same degree as the flanges 13 and 14. This plate is interspaced with respect to the shields 17, thus providing spaces in which the conveyer chains 21 may pass. The shields 17 overlap substantially the entire width of the conveyer chains, thus concealing them from view and also preventing the hands of the operator from coming in contact with them.

Arranged in the upper part of the casing is the toasting unit of our device. This toasting unit comprises a casing having a rear wall 25 and a front wall 26. The rear wall is preferably inclined and interspaced with respect to the rear wall 6 of the outer casing. The front wall 26 is also inclined and is interspaced with respect to the front plate 20.

The rear wall 25 extends up to substantially the top of the outer casing and is provided with a top portion 27 which may be secured to a piece of asbestos board 28 carried at the top of the outer casing. The front wall 26 extends to a point near the top of the outer casing and terminates at the upper curved portion 29 of the front plate 20. Bottom plates 30 extend across the bottom of the toasting unit. The toasting unit has double side walls 31 arranged at one side of the machine which are preferably formed of fire resisting and heat insulating material, such, for instance, as asbestos board. The other side of the unit is likewise provided with double side walls 32 of similar material. The side walls 31 and 32 extend preferably from the rear wall 25 to the front wall 26 of the toasting unit.

Formed vertically through the center of the toasting unit is a toasting chamber 35 on each side of which is formed a heating chamber 36. In each of the heating chambers is mounted an electrical heating unit 37. These heating units preferably comprise the customary resistance wire 38 which is threaded back and forth across suitable insulated supports 39 in a manner well known to those skilled in the art. A switch 45 is carried at the side of the machine for connecting a source of electric current to the heating units 37. The heating unit 37 at the front of the device is preferably carried by a frame 40 which is secured at the bottom to the plate 30 and at its top to a supporting plate 41. This supporting plate is attached to the curved portion 29 of the front plate 20, and the radius of its curvature is substantially the same as the radius of the curved portion 29. The vertical portion of this supporting plate lies substantially flush with the forward edge of the heating unit 37, thus forming a portion of the side wall of the toasting chamber 35. The heating unit 37 at the rear of the machine is carried by a frame 42 which is secured at its bottom to the bottom plate 30 at the rear of the machine and its sides by means of attached lugs 43 which pass through slots 44 formed in the inner of the side walls 31 and 32 of the toasting unit. The heating chamber at the front of the unit is bounded on one side by a wall 46, preferably of heat resisting material, and the heating chamber at the rear of the unit is bounded by a wall 47 of similar material. A portion near the top of the wall 46 is cut away, and a space provided between the portions of the wall by means of a curved casing 48 which joins the two portions of the wall, thus providing a chamber 49 for the element 50 of the thermostat 51. This thermostat is any one of a number of well known standard types and it controls the passage of electric current to the heating units 37 so that the temperature of the toasting chamber will be maintained within fixed limits. Since this thermostat is a standard article of manufacture, it is not shown or described in detail. The wall 47 of the rear heating chamber 36 extends preferably the full length of the toasting unit, and arranged in front of the upper end of this wall is an upper toasting chamber wall 55. This toasting chamber wall is arranged substantially flush with the forward edge of the heating chamber 36. The space between the walls 46 and 26, and the walls 47 and 25 is filled with a suitable heat insulating material such as rock wool or loose particles of asbestos, whereby the heat produced in the toasting chamber 35 is conserved and prevented from escaping by radiation.

The conveyer chains 21 pass around upper sprocket wheels 60 arranged near the top of the machine and carried by a shaft 61, suitably journaled in the casing. The shaft 61 is so positioned that the sprocket wheel is preferably concentric with the curved portion 29 of the front plate 20 and the curved portion of the plate 41. At the front of the machine and near the bottom thereof are lower sprocket wheels 62, one being arranged at each side of the machine and being rigidly mounted upon a shaft 63. This shaft is likewise suitably journaled in the casing. The centers of the shafts 61 and 63 are so arranged that the peripheries of the sprockets 62 and 60 will cause the forward pass of the chains to lie substantially parallel with the front plate 20. An operating crank 64 is mounted on the outside of the machine and is carried by the shaft 63, whereby the conveyer chains may be hand operated. Arranged near the center of the machine is a driving sprocket 65 for each of the chains. These driving sprockets are mounted upon a shaft 66 suitably journaled in the machine. The centers of the shafts 61 and 66 are such that the inner vertical pass of the chains will be substantially perpendicular and in line with the toasting chamber 35. One end of the shaft 66 extends through the inner side wall 10 of the casing, where it is preferably journaled (see Fig. 4), having its end disposed within the space 12 formed between the outer and inner side walls 9 and 10, respectively. Rotatably mounted upon this end of the shaft is the motor driven sprocket 67 of our device. Mounted in front of this sprocket and non-rotatably carried by the shaft 66 is a ratchet wheel 68. This ratchet wheel is connected with the motor driven sprocket 67 by means of a ratchet pawl 69 which is carried by this sprocket and kept in contact with the teeth of the ratchet wheel 68 by means of a spring 70. The ratchet wheel 68 and the pawl 69 are so arranged that the conveyer chains may be operated by hand by means of the crank 64 in the direction of travel without rotating the motor driven sprocket 67. The motor driven sprocket is connected by means of a drive chain 71 to a motor sprocket 72. This motor sprocket is carried by the shaft 73 of a gear reduction 74 which is carried by the motor 75. The gear reduction is a standard article of manufacture and is not shown or described in detail, aside from the fact that the shaft 73 is driven at a greatly reduced speed of rotation. The motor 75 is suitably carried by a lateral strip 76 which is secured to the base 5.

The rear wall 6 of the outer casing is provided with an enclosed pocket 80 in which is mounted a relay 81. This relay is a standard article of manufacture and is, therefore, not shown or described in detail. This relay controls the current supplied to the resistance wires 38 of the heating units 37, and it is actuated by the thermostat 51.

A standard snap switch 82 is preferably secured to the side wall 7, and this switch controls the supply of current to the motor. This switch is provided with an arm 83 having a slot 84 in its outer end. An operating rod 85 is connected by means of a pin 86 with the arm 83 by engagement with its slot 84. This operating rod is disposed within the space 11 between the walls 7 and 8 and extends outwardly through the flange 13 to the front of the machine where it is provided with an operating knob 87.

The conveyer chains 21 carry baskets 88, each of which comprises a rectangular open frame 89, the side walls 90 of which have depending lugs 91 at one end of the frame. These lugs are perforated so as to register with the rivets of the chains and where the baskets are to be located, such rivets are elongated and carry the baskets by the engagement of the apertures of the lugs with such rivets. Each of the baskets 88 is so arranged that the lugs 91 are at the top of the frame 89 on the upward pass of the chain. By this arrangement the baskets are moved to a vertical position against a guide 105 (to be hereinafter described) as the chain passes over the sprockets 60 and guided into the toasting chamber 35. By this arrangement also, the toast is quickly discharged from the basket as the lugs reach the sprockets 65. Each of the baskets is provided in its bottom with a plurality of parallel wires 92 which are secured to the top and bottom 93 and 94, respectively, of the frame. An idler 95 is preferably carried by each of the inner walls 8 and 10 and is arranged under the horizontal pass of the conveyer chains 21 and between the sprockets 62 and 65.

Figures 4, 5:
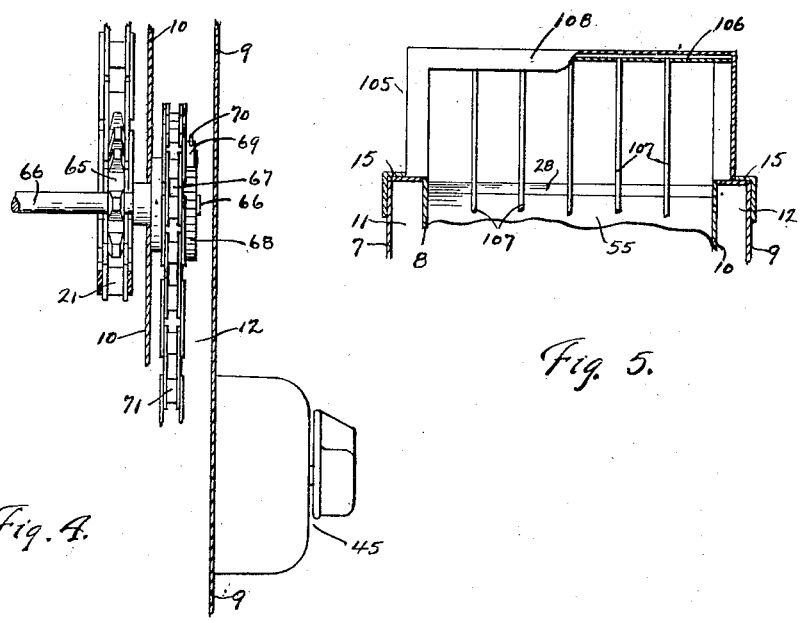
Fig. 4 is a fragmentary, sectional view taken on line 4—4 of Fig. 2.
Fig. 5 is a fragmentary, sectional view taken on line 5—5 of Fig. 1, and shows the face of the toast guide.

The outer casing is provided in its body with a curve-shaped chute 100 which extends inwardly and upwardly from the front of the device and which receives the toast as it is discharged from the baskets 88. Along the front of the machine is a receiving trough 101 having a rear wall 102 upon which the forward edge of the chute 100 rests. As the toast is discharged from the baskets 88, it slides down the chute 100 and drops upon and is deposited in the receiving trough 101. The guide 105, hereinbefore referred to, is arranged across the top of the machine, and in line with the back of the toasting chamber 35. This guide prevents the toast from falling out of the basket as it is passing around the sprocket 60 and is being moved to a straight-line position for passage into the toasting chamber 35. This guide may be in the form of a plate or in the form of an open frame 106 having a plurality of parallel wires 107 arranged at its front side, as shown in Fig. 5. These wires may extend down into the toasting chamber 35 to the bottom of the upper toasting chamber wall 55 where they may pass through a plate 104. A channel-shaped flange 108 is preferably arranged about the frame 106 to encase the frame thus covering the exposed ends of the wires and improving the appearance of the device.

Arranged in the back portion of the toasting unit of our device, and immediately above the rear heating chamber 36 is a shutter 109. This shutter is mounted for horizontal movement and is disposed within a casing 110. The shutter passes through a slot 111 and between horizontal guide plates 112. The shutter is long enough when fully extended, to close the space between the forward edges of the guide plates 112 and the supporting plate 41, thus closing the top of the toasting chamber 35. The shutter is operated by two operating arms 113, one arranged at each side of the shutter and passing through apertures formed in the rear edge thereof. The lower ends of these arms are carried by a rock-shaft 114. This shaft is suitably mounted for oscillation and has its ends extended through the walls 31 and 32 and inner walls 8 and 10. To the end of this shaft which projects into the space 11 between the walls 7 and 8 is carried an actuating arm 115. This arm is connected by means of a rod 116 to the arm 103 of a bellcrank lever 117. This bellcrank lever is pivotally supported in the space 11 and has its arm 118 connected with the pin 86 carried by the operating rod 85 and by the snap switch arm 83. Due to this arrangement of parts when the operating button 87 is pushed inwardly, the arm 83 of the snap switch 82 and the bellcrank lever 117 will be operated which will cause the shutter 109 to be moved toward its closed position through the medium of the rod 116, actuating arm 115, rock-shaft 114, and operating arms 113. If, however, one of the baskets 88 is opposite the shutter at the time it is operated, the forward edge of the shutter will engage with the edges of the frame 89 of the basket and prevent the shutter from being moved inwardly beyond the edge of the frame. When the shutter is thus prevented from moving the full amount of its travel, the snap switch 82 can not be operated to stop the motor. The conveyor chains will thus continue to move, and when the frame of the basket opposite the shutter moves past the shutter, the shutter will be permitted to move to the limit of its travel. This is done by means of the operating knob 87 and its connected parts. Obviously, the snap switch is also operated, thus stopping the motor.

Carried by the end of the rock-shaft 114 which projects into the space 12 between the side walls 9 and 10 is a spring arm 120, which carries at its upper end, one end of a helical spring 121. The lower end of this spring is attached to a pin 122. This pin is arranged immediately below the center of the shaft 114, so that it will cause the shutter to be urged in either direction when the spring arm 120 has passed the center of its movement. This will serve to force the shutter either fully open or fully closed.

From the foregoing description, it will be clear that when the operating button 87 is pulled outwardly, it will serve to close the snap switch 82 to start the motor and also to open the top of the toasting chamber 35 by withdrawing the shutter 109. When the motor is operating, the front pass of the conveyor chains 21 will be traveling in a vertical direction. The switch 45 having been previously closed, the toasting chamber having reached the desired temperature, the machine is ready to produce toast. Since at least four of the baskets 88 are exposed at the front of the machine at one time, it will be seen that the device may be very easily and quickly loaded with slices of bread. As the baskets reach the upper sprockets 60 they are turned up against the guide 105 and guided into the toasting chamber 35 through which they pass. The temperature and rate of travel of the conveyer chains is such that when each basket has reached the bottom of the toasting chamber, the bread will be properly toasted and will then be discharged from the basket onto the chute 100 down which it will slide and from which it will be deposited into the trough 101. Should the temperature get above the desired predetermined point, the thermostat will then operate in the well known manner and through the medium of the relay shut off the passage of current to the heating unit. Obviously, when the temeperature has reached the predetermined point below that for which the thermostat is set, the current will again be turned on.

When the toast is first placed within the machine, some time may be saved by passing the first piece of toast immediately into the toasting position in the toasting chamber without waiting for the relative slow movement of the motor. This is done manually by operating the chains through the medium of the handle 64.

Obviously, some modifications of the details herein shown and described may be made without departing from the spirit of our invention or the scope of the appended claims, and we do not, therefore, wish to be limited to the exact embodiment herein shown and described, the form shown being merely a preferred embodiment thereof.

Having thus described our invention, what we claim is:

1. A toasting machine comprising a casing, a plurality of traveling baskets mounted within the casing, a toasting unit mounted within the casing and being formed with a toasting chamber through which the baskets pass, an electrically operated heating unit at each side of the toasting chamber, shutter means for closing off the toasting chamber when the travel of the baskets is interrupted, an electric motor for operating the baskets, a snap switch for the motor, and means connecting the switch with the shutter, whereby the switch cannot be operated to stop the motor until the shutter has been fully operated to its closed position.

2. A toasting machine comprising a casing, a plurality of traveling baskets mounted within the casing, a toasting unit mounted within the casing and being formed with a toasting chamber through which the baskets pass, an electrically operated heating unit at each side of the toasting chamber, a reciprocating shutter for closing the top of the toasting chamber, operating arms engageable with the shutter, an operating shaft carrying the arms, and means for operating the shaft.

3. A toasting machine comprising a casing, a plurality of traveling baskets mounted within the casing, a toasting unit mounted within the casing and being formed with a toasting chamber through which the baskets pass, an electrically operated heating unit at each side of the toasting chamber, a reciprocating shutter for closing the top of the toasting chamber, operating arms engageable with the shutter, an operating shaft carrying the arms, spring means for causing the shutter to be moved to its fully open and fully closed position, and means for operating the shaft.

4. A toasting machine comprising a casing, a plurality of traveling baskets mounted within the casing, a toasting unit mounted within the casing and being formed with a toasting chamber through which the baskets pass, an electrically operated heating unit at each side of the toasting chamber, a reciprocating shutter for closing the top of the toasting chamber, operating arms engageable with the shutter, an operating shaft carrying the arms, an electric motor for operating the baskets, a snap switch for the motor, and means connecting the switch with the operating shaft of the shutter, whereby the switch can not be operated to stop the motor until the shutter has been fully operated to its closed position.

In testimony whereof, we have hereunto signed our names.

WILLIAM J. McCAIG.
LESTER E. PADELFORD.